US007333099B2

(12) United States Patent
Inukai

(10) Patent No.: US 7,333,099 B2
(45) Date of Patent: Feb. 19, 2008

(54) ELECTRONIC CIRCUIT, DISPLAY DEVICE, AND ELECTRONIC APPARATUS

(75) Inventor: Kazutaka Inukai, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 649 days.

(21) Appl. No.: 10/747,078

(22) Filed: Dec. 30, 2003

(65) Prior Publication Data

US 2004/0150350 A1 Aug. 5, 2004

(30) Foreign Application Priority Data

Jan. 6, 2003 (JP) ............................ 2003-000669

(51) Int. Cl.
*G06F 3/038* (2006.01)
*G09G 5/00* (2006.01)

(52) U.S. Cl. ........................................ 345/205; 345/82

(58) Field of Classification Search .................. 345/76, 345/82, 204, 205, 87; 315/169.1, 169.3; 327/108
See application file for complete search history.

(56) References Cited

U.S. PATENT DOCUMENTS 3,766,543 A 10/1973 Te Winkel et al.
4,847,567 A 7/1989 Fenk
5,140,594 A * 8/1992 Haulin ....................... 714/797
5,374,242 A * 12/1994 Haak et al. .................... 604/20
5,748,165 A 5/1998 Kubota et al.
6,091,203 A 7/2000 Kawashima et al.
6,229,506 B1 5/2001 Dawson et al.
6,344,843 B1 2/2002 Koyama et al.
6,501,466 B1 12/2002 Yamagishi et al.
6,586,888 B2 7/2003 Kitahara et al.
6,611,107 B2 8/2003 Mikami et al.
6,798,148 B2 9/2004 Inukai
2002/0047817 A1 4/2002 Tam
2003/0058687 A1 3/2003 Kimura
2003/0128200 A1 7/2003 Yumoto (Continued)

FOREIGN PATENT DOCUMENTS

EP 1 103 946 A2 5/2001

(Continued)

OTHER PUBLICATIONS

Hunter et al.; "Active Matrix Addressing of Polymer Light Emitting Diodes Using Low Temperature Poly Silicon TFTs"; *AM-LCD 2000*; pp. 249-252; 2000.

(Continued)

*Primary Examiner*—Ricardo Osorio
(74) *Attorney, Agent, or Firm*—Fish & Richardson P.C.

(57) ABSTRACT

A current data compression circuit of which output current value is accurate even when transistors with large variations in electrical characteristics are used. The current data compression circuit is an electronic circuit comprising a drive element including a plurality of transistors and a means for switching over a series connection state and a parallel connection state of the transistors. An inputted current is compressed for output by the current data compression circuit. Or, the current data compression circuit is an electronic circuit comprising a drive element including a plurality of transistors in which the transistors are used in parallel connection states when inputting current and in series connection states when outputting current.

26 Claims, 8 Drawing Sheets

U.S. PATENT DOCUMENTS

| | | | |
|---|---|---|---|
| 2003/0142046 A1 | 7/2003 | Kasai et al. |
| 2003/0164685 A1 | 9/2003 | Inukai |
| 2004/0041752 A1 | 3/2004 | Kimura |
| 2004/0239379 A1 | 12/2004 | Inukai |
| 2005/0030304 A1 | 2/2005 | Inukai |

FOREIGN PATENT DOCUMENTS

| | | |
|---|---|---|
| EP | 1 282 103 | 2/2003 |
| EP | 1 333 422 | 8/2003 |
| JP | 1 102 234 A2 | 5/2001 |
| JP | 2001-147659 | 5/2001 |
| JP | 2001-343933 | 12/2001 |
| JP | 2003-255896 | 9/2003 |
| WO | WO98-48403 | 10/1998 |

OTHER PUBLICATIONS

Hunter et al.; "Performance of p-Si pixel circuits for Active Matrix Polymer LED Displays"; *AM-LCD 2001*; pp. 215-218; 2001.

Kurita; "Requirements for LCD to Gain High Moving Image Quality~ Improvement of Quality Degraded by Hold-Type Display~"; *AM-LCD 2000*; pp. 1-4; 2000.

Yumoto et al.; "Pixel-Driving Methods for Large-Sized Poly-Si AM-OLED Displays"; *Asia Display / IDW '01*; pp. 1395-1398; 2001.

* cited by examiner

ELECTRONIC CIRCUIT, DISPLAY DEVICE, AND ELECTRONIC APPARATUS

BACKGROUND OF THE INVENTION

1. Field of the Invention

The present invention relates to an electronic circuit and more particularly a technology of an electronic circuit which compresses current data. Also the invention relates to an integrated circuit (IC) or a system circuit using the electronic circuit in one portion thereof, and more particularly a display device or an electronic apparatus having the IC or the system circuit.

2. Description of the Related Art

As electronic apparatus has been advanced in high performance, compactness (miniaturization) and low power consumption, an IC (integrated circuit) used inside thereof is required to be high in performance, small and highly integrated and such demands are further growing. A MOSFET (Field-Effect Transistor) IC using a conventional general bulk silicon (silicon wafer) has been progressed in performance, compactness and integration steadily up to now and this tendency is likely to continue.

An IC using a thin film transistor (TFT) is one of the ICs which are expected to be improved in performance, compactness and integration.

An active matrix type (AM type) liquid crystal display (LCD) using a polycrystalline silicon (polysilicon) TFF which has recently become used in a small display device field has a great advantage in that a driver circuit and the like can be integrated on a panel not only that a video signal can be stored in a pixel portion. That is, a module is large and complicated in a conventional PM type (passive matrix type) and an AM type which is using an amorphous silicon TFT because ICs separately fabricated into chips have to be used for a driver circuit and the like. In an AM type using a polysilicon TFT in which a driver circuit and the like are integrated on a panel, however, a module is greatly miniaturized.

Integration of a driver circuit and the like on a panel also plays a great role in realizing a fine-pitched display of display device. In the case where a driver circuit is not integrated on the panel, the finest possible pixel pitch in the display of display device is dependent on the interval between connecting terminals on the panel which connect an external IC to the panel. By integrating a driver circuit on the panel, this dependency no longer exists.

At present, only rather simple circuit represented by a driver circuit can be integrated on the panel in the AM type LCD using the polysilicon TFT. However, it is an inevitable subject to improve the circuit integrated on the panel in performance, compactness and integration in order to realize a more advanced, complicated and multifunctional panel.

There are various kinds of circuit to be newly integrated on the panel, including a circuit which compresses current data.

Just like in the AM type LCD, in an AM type OLED (Organic Light Emitting Diode) display device, a circuit integrated on the panel is required to be high in performance, compact and highly integrated. As for an OLED display device, only a PM type is put into practical use for the present, but an AM type using a polysilicon TFT is also now being developed rapidly aiming at practical use. Further, as the OLED is a current drive while the liquid crystal is a voltage drive, a means in which a video signal is processed as current data is becoming a mainstream in the OLED display device. In that case, a current data compression circuit is highly required when processing video signals.

The most common circuit which compresses current data is a current mirror circuit. FIG. 3 shows an example of the current mirror circuit.

SUMMARY OF THE INVENTION

Hereinafter explained is the case where an input current is compressed by using the current mirror circuit. The explanation here is made on the case where the input current is compressed to ½ as large. It is assumed hereafter that a transistor is an ideal MOSFET, and for the channel size, length is denoted as L, width is denoted as W, and insulating film thickness is denoted as d.

It is assumed that transistors 312 and 313 are equal in d, and the ratio of W/L of the transistor 312 to the transistor 313 is 2:1.

When inputting current data, transistors 315 and 316 are both turned ON and a current flows between 320 and 321. When the current value reaches a stationary value, the transistor 316 is turned OFF and the transistor 315 is turned OFF, too. By operating the transistor 313 in a saturation region, an output current value becomes ½ of an input current value.

When electrical characteristics (such as threshold voltage value, field-effect mobility and the like) of the transistors 312 and 313 are uniform, the output current value becomes exactly ½ of the input current value. That is, current data is compressed accurately. However, when there are variations in the electrical characteristics of the transistors 312 and 313, compression becomes inaccurate depending on the variations.

Generally, the variation in the electrical characteristic of a polysilicon TFT is generated easily due to defects and the like in a crystal grain boundary. In the circuit of FIG. 3, by arranging the transistors 312 and 313 adjacently, the variations in electrical characteristics can be alleviated though slightly. In the case where the accuracy of the current value is required, however, it is not appropriate to use the current mirror circuit as shown in FIG. 3 as a current data compression circuit.

In view of the foregoing problems, it is the primary object of the invention to provide a current data compression circuit of which output current value is accurate even when transistors with large variations in electrical characteristics such as polysilicon TFTs are used.

A current data compression circuit of the invention is an electronic circuit comprising a drive element having a plurality of transistors, and a means for switching over a series connection state and a parallel connection state of the plurality of transistors, wherein an inputted current is compressed for output. The current data compression circuit of the invention is an electronic circuit comprising a drive element having a plurality of transistors, wherein the plurality of transistors become the parallel connection state when inputting current and the series connection state when outputting the current.

A current data compression circuit of the invention is an electronic circuit which compresses the inputted current for output comprising a drive element having a plurality of transistors, switches, wherein the gates of the plurality of transistors are connected to each other, at least one of source or drain of each plurality of transistors is connected to a source or drain of another transistor of the plurality of transistors, and the plurality of transistors become series connection state and parallel connection state by changing over the switches.

A current data compression circuit of the invention is an electronic circuit comprising n transistors, first and second switches, wherein gates of the n transistors are electrically connected to each other, either sources or drains of the n transistors are electrically connected to the first switch respectively, another sources or drains of the n transistors are electrically connected to the second switch respectively, when current is inputted to the electronic circuit, as for a kth transistor of the n transistors ($2 \leqq k<n$), the current flows from the side connected to the second switch to the side connected to the first switch, and when the current is outputted from the electronic circuit, as for the kth transistor, the current flows through a (k−1)th transistor to a (k+1)th transistor via the kth transistor.

The current data compression circuit of the invention can be fabricated on an insulating substrate by using a polysilicon film TFT and the like. Needless to say, a bulk silicon (wafer) transistor can be employed as well. The current data compression circuit of the invention can be applied to an IC for such system circuit and the like of electronic apparatus as a signal processing circuit, a control circuit, an interface circuit and the like. The current data compression circuit of the invention can also be applied to a driver circuit of a display device.

In the plurality of transistors provided in the drive element in the current data compression circuit of the invention, structural parameters (channel length L, channel width W and insulating film thickness d and the like) and channel types (n-channel type and p-channel type) thereof are not necessarily but preferably the same unless otherwise specially needed. In the following examples, the parameters and channel types are the same.

DETAILED DESCRIPTION OF THE PREFERRED EMBODIMENTS

Embodiment Mode 1

An outline of a current data compression circuit of the invention is now explained with reference to FIGS. 1 and 2.

First, FIG. 1 is explained. FIG. 1A shows an example of the current data compression circuit of the invention. FIG. 1B shows FIG. 1A in which a drive element is illustrated by three transistors.

Figure 1A:
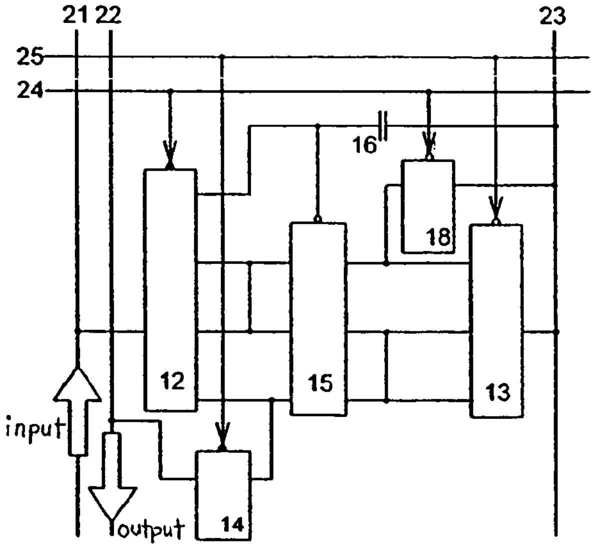
FIGS. 1A to 1E are diagrams showing examples of a current data compression circuit of the invention.
Figure 1B:
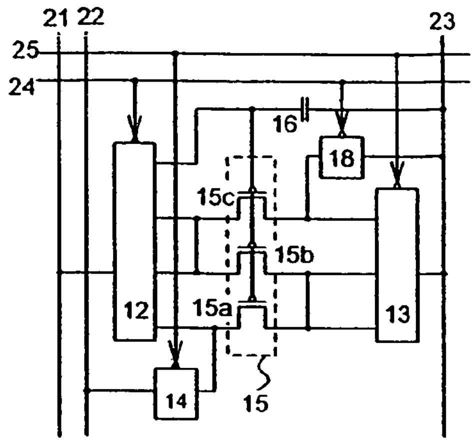

The current data compression circuit of FIGS. 1A and 1B include a first switch 12, a second switch 13, a third switch 14, and a fourth switch 18 besides a drive element 15. As for each of first to fourth switches in FIG. 1, a point of ○ (open circle) or ● (close circle) denotes a control portion of the switches, and each of other plurality of points becomes conductive or open simultaneously in accordance with the signal sent to the control portion. The control portion ○ (open circle) denotes low active (conductive when signal is low), and the control portion ● (close circle) denotes high active (conductive when signal is high). The first switch 12, the second switch 13, the third switch 14, and the fourth switch 18 correspond to a means for switching over a series connection state and a parallel connection state of the plurality of transistors provided in the drive element.

Figure 1C:
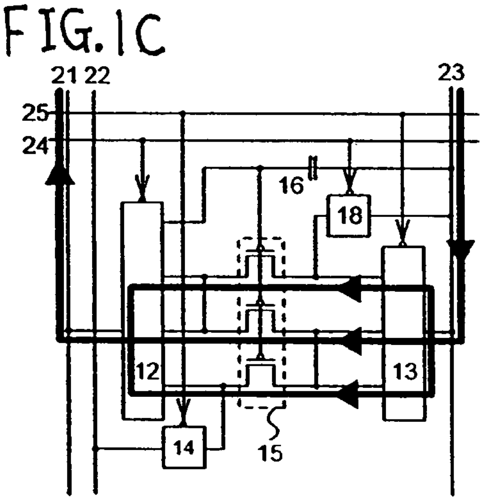
Figure 1D:
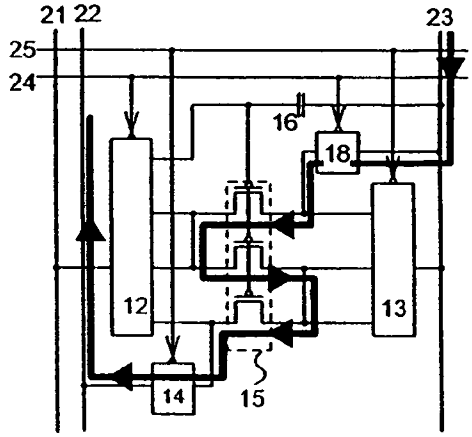
Figure 1E:
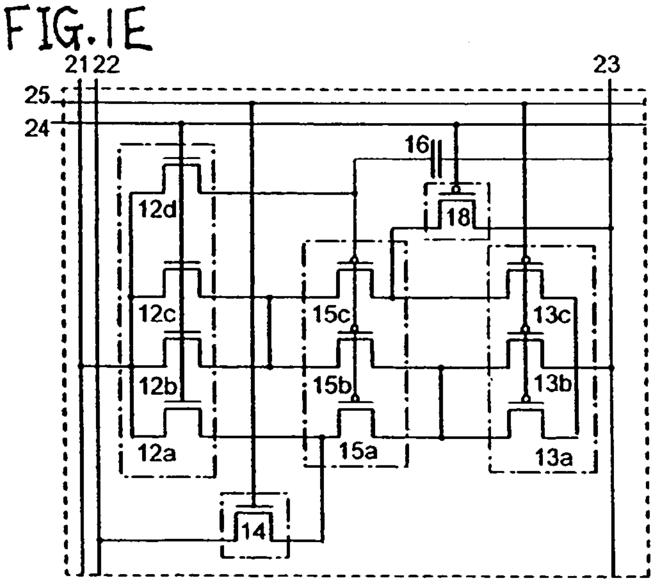

FIG. 1E shows an example of FIG. 1A in which not only the drive element but also each switch is illustrated by transistors. Needless to say, each switch is capable of being illustrated by other transistor configurations than this and not limited to this configuration. Moreover, as for the first switch 12 and the second switch 13 and the like which change 3 or more points over conductive and open simultaneously, an arbitrary portion can be separated to be controlled independently from the other portions.

In FIGS. 1A and 1B reference numeral 21 denotes a current data input line, 22 denotes an output line, 23 denotes a high voltage power source line, 24 denotes a first control line, and 25 denotes a second control line.

The first switch 12, the second switch 13, the third switch 14, and the fourth switch 18 are controlled as follows when current data is inputted and outputted. When the current data is inputted, the first switch 12 and the second switch 13 are turned ON (conductive), while the third switch 14 and the fourth switch 18 are turned OFF (open). On the other hand, when the current data is outputted, the first switch 12 and the second switch 13 are turned OFF (open), while the third switch 14 and the fourth switch 18 are turned ON (conductive). Results of the foregoing operations are shown in FIGS. 1C and 1D. FIG. 1C shows a current path in the case of inputting current data in a bold line, and FIG. 2D shows a current path in the case of outputting current data in a bold line. In FIG. 1C, current flows through three transistors of a drive element in a parallel state, while in FIG. 1D current flows through three transistors of a drive element in a series state.

In the case where three transistors of the drive element in FIG. 1 are uniform in electrical characteristics, the output current is 1/9 of the input current. Generally, in the case where the drive element is configured by n transistors which are uniform in electrical characteristics, the output current becomes $1/n^2$ of the input current.

Figure 3:
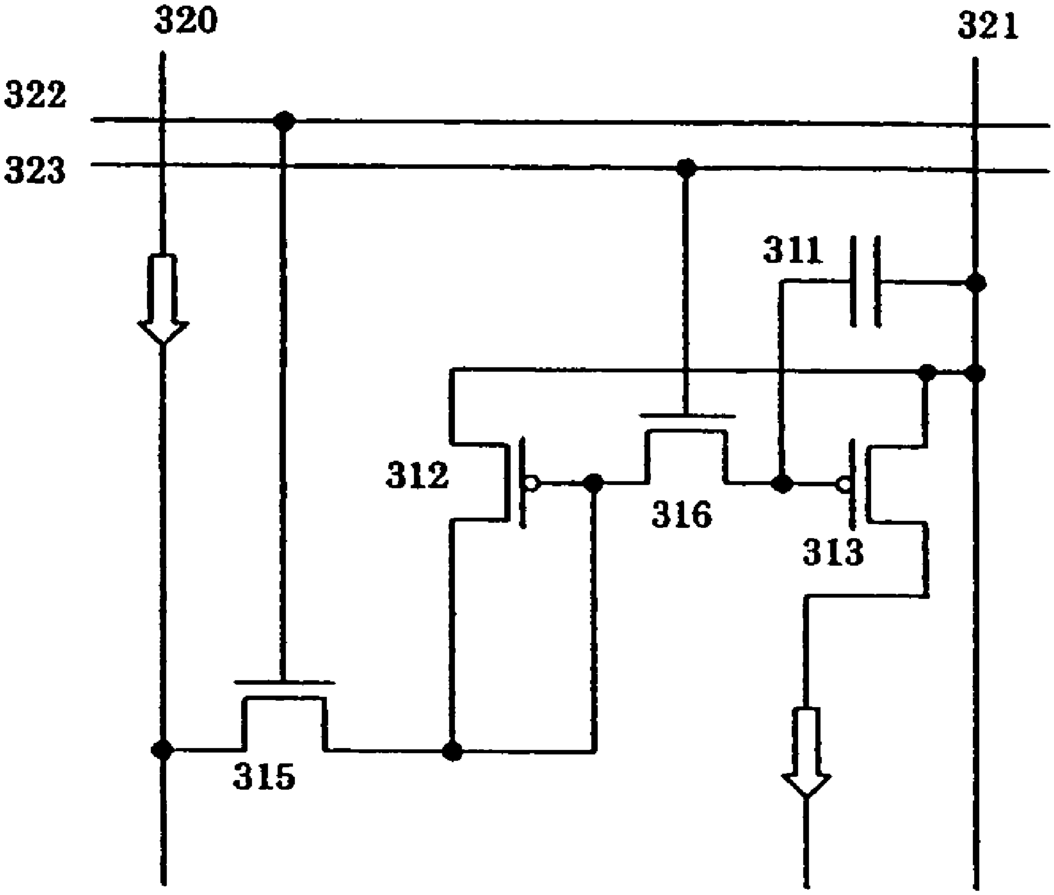
FIG. 3 is a diagram showing an example of a current data compression circuit.

It is to be noted that in the case where the three transistors of the drive element have some variations in electrical characteristics, the output current deviates slightly from the output current of 1/9 of the input current in accordance with the variation. Of course, this deviation is small as compared to the case where the current mirror circuit shown in FIG. 3 is employed. Therefore, the current data compression circuit of the invention is effective in the case where some variations in electrical characteristics of the transistors are inevitable.

As for the three transistors of the drive element in FIG. 1, it is desirable that each source and drain is formed in symmetry. This is because the direction of current flow is inverted in the transistor 15*b* between when inputting and outputting current data. Of course, a current data compression circuit of the invention does not necessarily require a source and drain to be formed in symmetry, though.

Embodiment Mode 2

FIG. 2 is explained now. FIGS. 2A to 2D show four other examples of a current data compression circuit of the invention. It should be noted that a current data compression circuit of the invention can be configured in so many various ways that all of them cannot be shown, thus FIGS. 2A to 2D are only representative examples.

Each of first to fourth switches of FIG. 2 is the same as the ones in FIG. 1. ○ (open circle) or ● (close circle) is a control portion of the switches, and each of other plurality of points becomes conductive or open simultaneously in accordance with the signal sent to the control portion. The control portion ○ (open circle) denotes low active (conductive when signal is low), and the control portion ● (close circle) denotes high active (conductive when signal is high). Each of the switches in FIG. 2 can be illustrated by transistors as is in FIG. 1E, however, it is omitted here for simplicity.

Figure 2A:
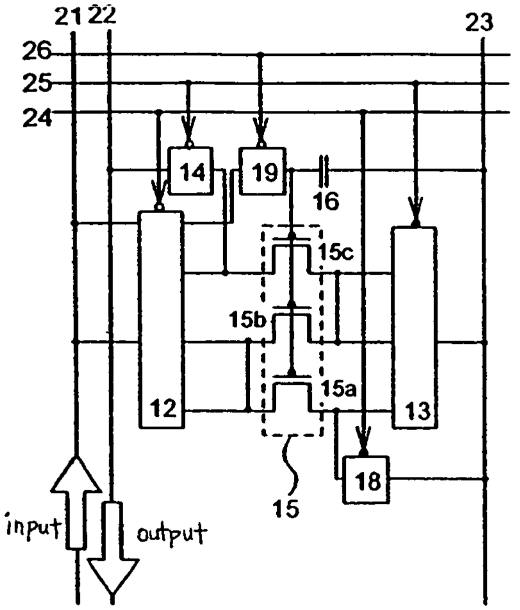
FIGS. 2A to 2D are diagrams showing examples of a current data compression circuit of the invention.

FIG. 2A shows a configuration example in which a drive element is configured by n-channel type transistors and the direction of current is inverted from the one in FIG. 1. Also this configuration example is intended to reduce the influence of operation noise by separating a first switch into two switches of 12 and 19.

In FIG. 2A, the drive element is configured by three transistors. A current data compression circuit of FIG. 2A includes first switches 12 and 19, a second switch 13, a third switch 14, and a fourth switch 18 besides the drive element 15. The first switches 12 and 19, the second switch 13, the third switch 14, and the fourth switch 18 correspond to a means for switching over a parallel connection state and a series connection state of the plurality of transistors provided in the drive element.

In FIG. 2A, reference numeral 21 denotes a current data input line, 22 denotes an output line, 23 denotes a low voltage power source line, 24 and 26 denote first control lines, and 25 denotes a second control line.

The first switches 12 and 19, the second switch 13, the third switch 14, and the fourth switch 18 are controlled as follows when current data is inputted and outputted. When the current data is inputted, the third switch 14 and the fourth switch 18 are turned OFF, while the first switches 12 and 19 and the second switch 13 are turned ON. On the other hand, when the current data is outputted, the first switches 12 and 19 and the second switch 13 are turned OFF while the third switch 14 and the fourth switch 18 are turned ON. As a result, current flows through three transistors 15*a*, 15*b* and 15*c* of the drive element in a parallel state when inputting current data, and current flows through the three transistors 15*a*, 15*b* and 15*c* of the drive element in a series state when outputting current data.

Further, when switching over the input of current data to the output, it is preferable that the first switch 19 is turned OFF before turning OFF the first switch 12 and the second switch 13. Thus, the influence of operation noise can be reduced.

In the case where three transistors of the drive element in FIG. 2A are uniform in electrical characteristics, the output current becomes 1/9 of the input current. Generally, in the case where the drive element is configured by n transistors which are uniform in electrical characteristics, the output current becomes $1/n^2$ of the input current.

It is to be noted that in the case where the three transistors of the drive element have some variations in electrical characteristics, the output current deviates slightly from the output current of 1/9 of the input current in accordance with the variations. Of course, this deviation is small as compared to the case where the current mirror circuit shown in FIG. 3 is employed. Therefore, the current data compression circuit of the invention is effective in the case where some variations in electrical characteristics of the transistors are inevitable.

As for the three transistors of the drive element in FIG. 2A, it is desirable that each source and drain is formed in symmetry. This is because the direction of current flow is inverted in the transistor 15*b* between when inputting and outputting current data. Of course, a current data compression circuit of the invention does not necessarily require a source and drain to be formed in symmetry, though.

Figure 2B:
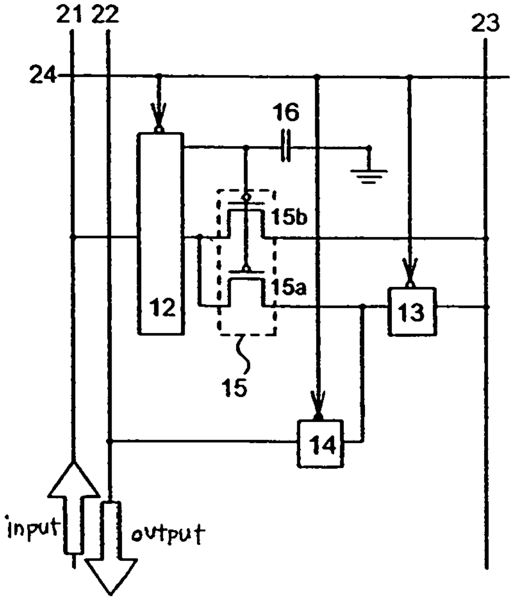

FIG. 2B is a configuration example in which a drive element is configured by two transistors. This configuration is also intended to reduce the arrangement area by miniaturizing the second switch 13 and merging control lines into one line. Moreover, a capacitor 16 is connected to GND.

A current data compression circuit in FIG. 2B includes a first switch 12, a second switch 13, and a third switch 14 besides a drive element 15. The first switch 12, the second switch 13, the third switch 14 correspond to a means for switching over a series connection state and a parallel connection state of the plurality of transistors provided in the drive element.

In FIG. 2B, reference numeral 21 denotes a current data input line, 22 denotes an output line, 23 denotes a high voltage power source line, and 24 denotes a control line.

The first switch 12, the second switch 13, and the third switch 14 are controlled as follows when current data is inputted and outputted. When the current data is inputted, the third switch 14 is turned OFF (open), while the first switch 12 and the second switch 13 are turned ON (conductive). On the other hand, when the current data is outputted, the first switch 12 and the second switch 13 are turned OFF (open) while the third switch 14 is turned ON (conductive). As a result, current flows through two transistors 15*a* and 15*b* of the drive element in a parallel state when inputting current data, and current flows through the two transistors 15*a* and 15*b* of the drive element in a series state when outputting current data.

In FIG. 2B, the capacitor 16 is provided between a gate electrode of two transistors of the drive element and GND. However, as the power source line 23 always supplies a constant voltage, the capacitor 16 stores a voltage at the time of writing between gates and sources of the two transistors of the drive element. In this respect, there is no difference from examples of FIG. 1 and other three examples of FIG. 2.

In the case where two transistors of the drive element in FIG. 2B are uniform in electrical characteristics, the output current becomes ¼ of the input current. Generally, in the case where the drive element is configured by n transistors which are uniform in electrical characteristics, the output current becomes $1/n^2$ of the input current.

It is to be noted that in the case where the two transistors of the drive element have some variations in electrical characteristics, the output current deviates slightly from the output current of ¼ of the input current in accordance with the variations. Of course, this deviation is small as compared to the case where the current mirror circuit shown in FIG. 3 is employed. Therefore, the current data compression circuit of the invention is effective in the case where some variations in electrical characteristics of the transistors are inevitable.

As for the two transistors of the drive element in FIG. 2B, it is desirable that each source and drain is formed in symmetry. This is because the direction of current flow is inverted in the transistor 15*a* between when inputting and outputting current data. Of course, a current data compression circuit of the invention does not necessarily require a source and drain to be formed in symmetry, though.

Figure 2C:
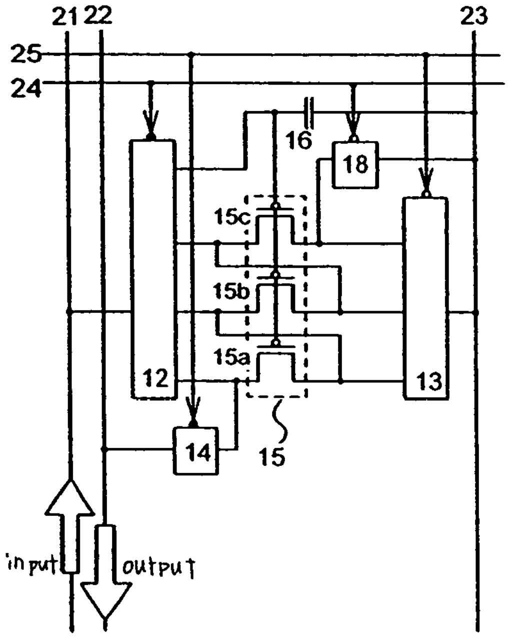
Figure 2D:
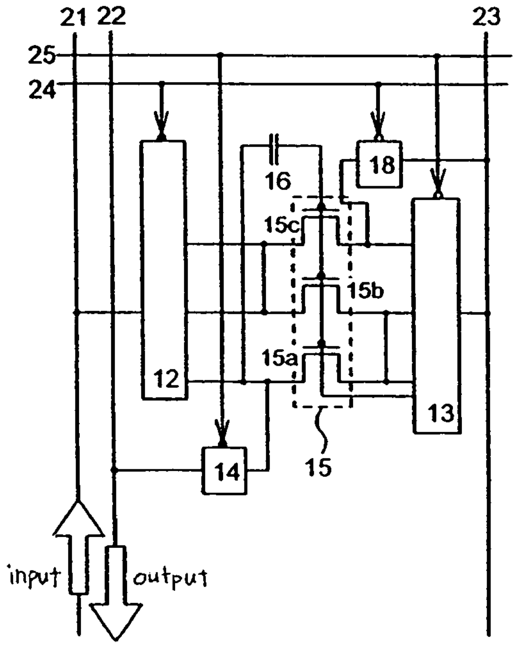

FIG. 2C shows a configuration example in which the transistors of the drive element are connected differently from the ones in FIG. 1.

In FIG. 2C, a drive element is configured by three transistors. A current data compression circuit in FIG. 2C includes a first switch 12, a second switch 13, a third switch 14, and a fourth switch 18 besides the drive element 15. The first switch 12, the second switch 13, the third switch 14, and the fourth switch 18 correspond to a means for switching over a parallel connection state and a series connection state of the plurality of transistors provided in the drive element.

In FIG. 2C, reference numeral 21 denotes a current data input line, 22 denotes an output line, 23 denotes a high voltage power source line, 24 denotes a first control line, and 25 denotes a second control line.

The first switch 12, the second switch 13, the third switch 14, and the fourth switch 18 are controlled as follows when current data is inputted and outputted. When the current data is inputted, the third switch 14 and the fourth switch 18 are turned OFF, while the first switch 12 and the second switch 13 are turned ON. On the other hand, when the current data is outputted, the first switch 12 and the second switch 13 are turned OFF while the third switch 14 and the fourth switch 18 are turned ON. As a result, current flows through three transistors 15*a*, 15*b* and 15*c* of the drive element in a parallel state when inputting current data, and current flows through the three transistors 15*a*, 15*b* and 15*c* of the drive element in a series state when outputting current data.

In the case where three transistors of the drive element in FIG. 2C are uniform in electrical characteristics, the output current becomes ⅑ of the input current. Generally, in the case where the drive element is configured by n transistors which are uniform in electrical characteristics, the output current becomes $1/n^2$ of the input current.

It is to be noted that in the case where the three transistors of the drive element have some variations in electrical characteristics, the output current deviates slightly from ⅑ of the input current in accordance with the variations. Of course, this deviation is small as compared to the case where the current mirror circuit shown in FIG. 3 is employed. Therefore, the current data compression circuit of the invention is effective in the case where some variations in electrical characteristics of the transistors are inevitable.

Note that, as for the three transistors in FIG. 2C, the direction of current flow is not inverted between when inputting and outputting current data. Thus, higher performance can be expected in the circuit shown in FIG. 2C as compared to examples in FIG. 1.

FIG. 2D shows a configuration example in which the drive element is configured by n-channel type transistors and the direction of current flow is the same as the one in FIG. 1.

In FIG. 2D, a drive element is configured by three transistors. A current data compression circuit in FIG. 2D includes a first switch 12, a second switch 13, a third switch 14, and a fourth switch 18 besides the drive element 15. The first switch 12, the second switch 13, the third switch 14, and the fourth switch 18 correspond to a means for switching over a parallel connection state and a series connection state of the plurality of transistors provided in the drive element.

In FIG. 2D, reference numeral 21 denotes a current data input line, 22 denotes an output line, 23 denotes a high voltage power source line, 24 denotes a first control line, and 25 denotes a second control line.

The first switch 12, the second switch 13, the third switch 14, and the fourth switch 18 are controlled as follows when current data is inputted and outputted. When the current data is inputted, the third switch 14 and the fourth switch 18 are turned OFF, while the first switch 12 and the second switch 13 are turned ON. On the other hand, when the current data is outputted, the first switch 12 and the second switch 13 are turned OFF while the third switch 14 and the fourth switch 18 are turned ON. As a result, current flows through three transistors 15*a*, 15*b* and 15*c* of the drive element in a parallel state when inputting current data, and current flows through the three transistors 15*a*, 15*b* and 15*c* of the drive element in a series state when outputting current data.

In the case where three transistors of the drive element in FIG. 2D are uniform in electrical characteristics, the output current becomes ⅑ of the input current. Generally, in the case where the drive element is configured by n transistors which are uniform in electrical characteristics, the output current becomes $1/n^2$ of the input current.

It is to be noted that in the case where the three transistors of the drive element have some variations in electrical characteristics, the output current deviates slightly from ⅑ of the input current in accordance with the variations. Of course, this deviation is small as compared to the case where the current mirror circuit shown in FIG. 3 is employed. Therefore, the current data compression circuit of the invention is effective in the case where some variations in electrical characteristics of the transistors are inevitable.

As for the three transistors of the drive element in FIG. 2D, it is desirable that each source and drain is formed in symmetry. This is because the direction of current flow is inverted in the transistor 15*b* between when inputting and outputting current data. Of course, a current data compression circuit of the invention does not necessarily require a source and drain to be formed in symmetry, though.

In FIGS. 2A to 2D as above, representative examples of a current data compression circuit of the invention are shown by illustrating the cases where a drive element is configured by two or three transistors. However, of course the drive element of the current data compression circuit of the invention may be configured by four or more transistors as well.

Furthermore, the number of control lines is not limited and any control line of any switches may be merged. In FIG. 2C, for example, the first control line 24 controls the first switch 12 and the fourth switch 18, and the second control line 25 controls the second switch 13 and the third switch 14. However, the first control line 24 may control the first switch 12 and the third switch 14, and the second control line 25 may control the second switch 13 and the fourth switch 18. Furthermore, a third control line and a fourth control line for controlling the third switch 14 and the fourth switch 18 respectively may be provided newly in order to control each switch independently. On the contrary, the first control line 24 may control the first switch 12 to fourth switch 18. (Of course, if necessary, adjustment such as polarities of some switches are inverted is required.)

Further, element in FIG. 1 and FIGS. 2A to 2D may be used in various combinations. For example, in the case where the drive element is configured by two transistors as shown in FIG. 2B, n-channel transistors may be employed as shown in FIG. 2D. Or, the transistors in the drive element being connected as in FIG. 2C, the direction of current flow may be inverted as in FIG. 2A. The same applies to the combination of other elements. The same is also applied to the case where the drive element is configured by four or more transistors.

A current data compression circuit of the invention may be used with additional transistors or other elements and circuits.

Embodiment Mode 3

An example of a data driver circuit of an AM type OLED display device, to which the current data compression circuit of the invention is applied is explained with reference to FIGS. 7 to 9 in Embodiment Mode 3. The data driver circuit in this example is such type of circuit that a video signal of an original analog current value is read in and a video signal of a compressed analog current is written to a data line.

Figure 8:
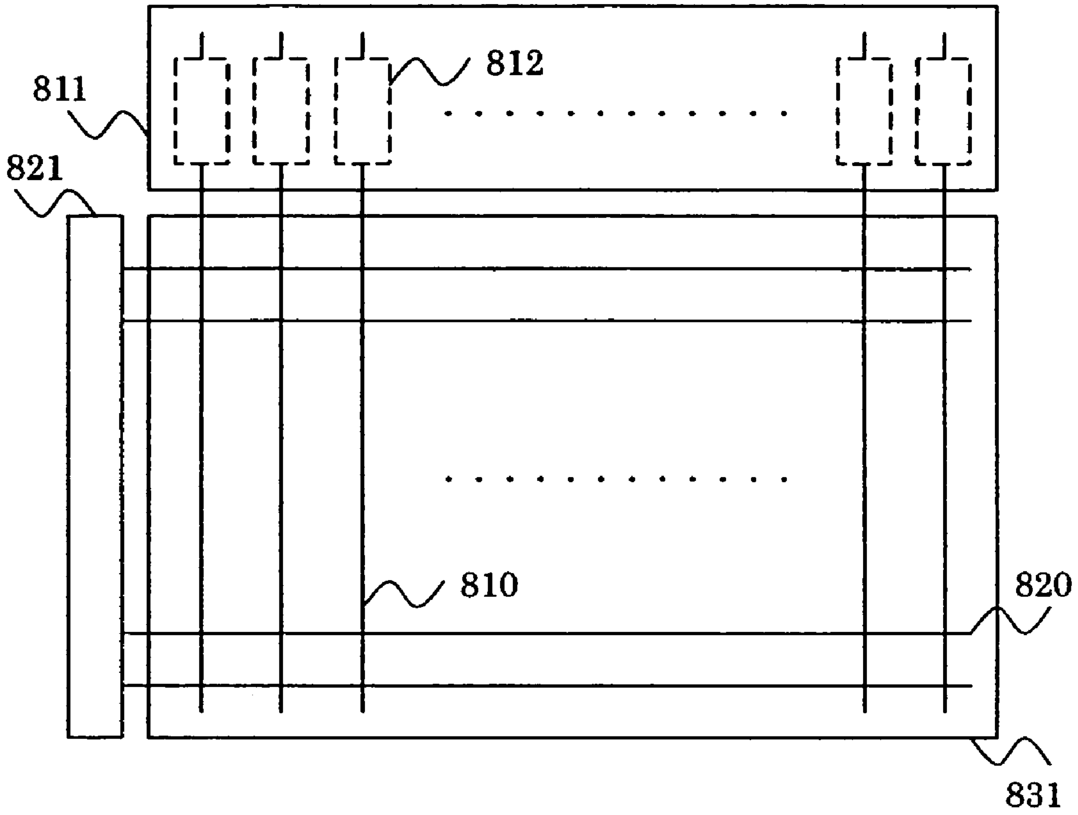
FIG. 8 is a diagram showing an configuration example of an AM type OLED display device.

FIG. 8 shows an outline of the AM type OLED display device. Each data line 810 and each scan line 820 are disposed in a matrix in a pixel portion 831. A scan driver circuit 821 outputs a selection pulse to each scan line 820 in sequence. Each data line 810 transmits a video signal, which is outputted from a data driver circuit 811 in synchronous with the selection pulse, to the pixel portion 831.

Figure 7:
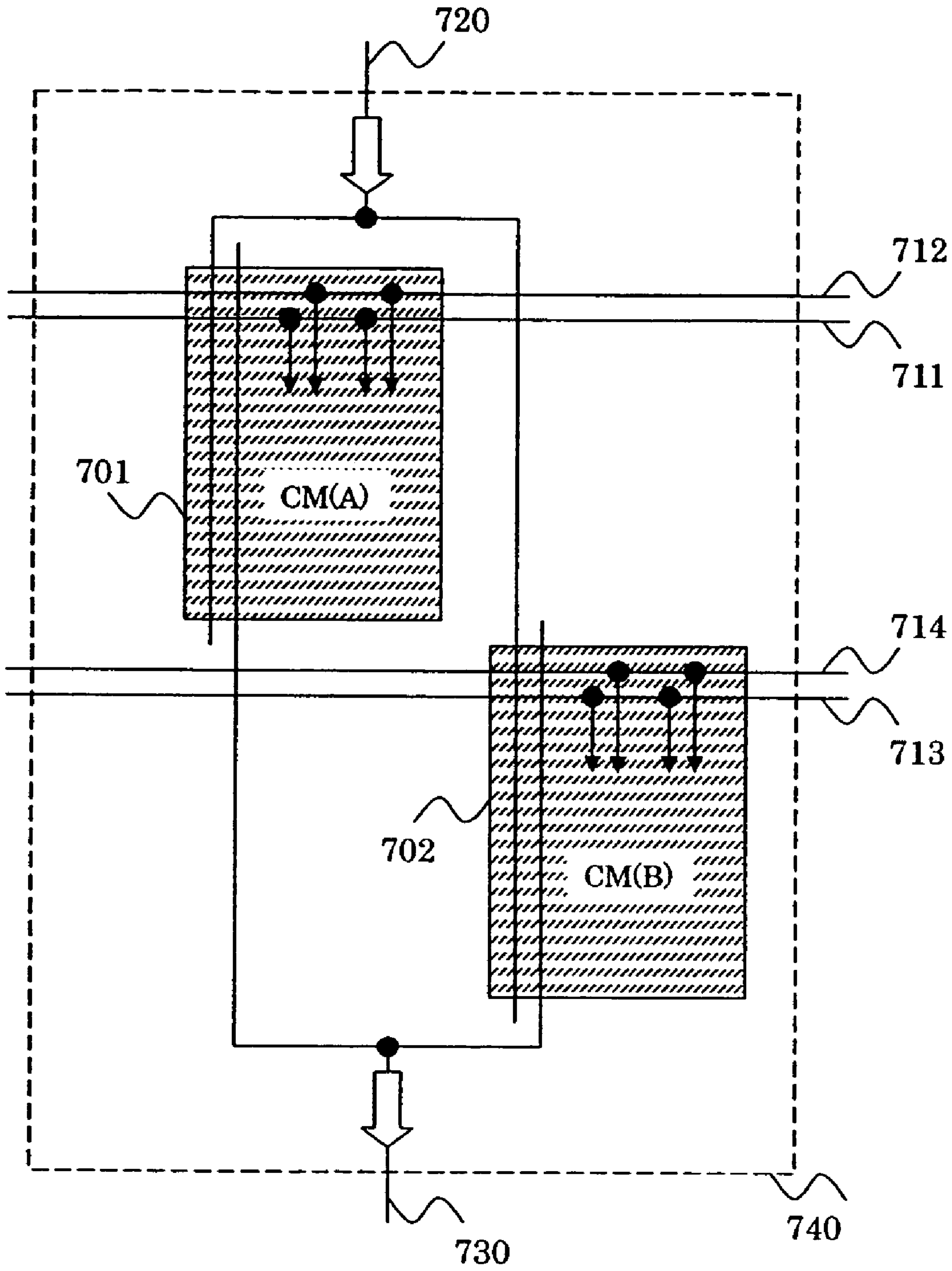
FIG. 7 is a diagram showing an example of a data driver circuit using a current data compression circuit of the invention.

A portion surrounded by a broken line 812 corresponds to a unit of data driver circuit configured as 740 in FIG. 7 by which the video signal is written to each data line. For the explanation below, it is assumed here that the configuration of a current data compression circuit 701 (also referred to as CM (A)) is the same as that in FIG. 1B. It is assumed that the configuration of a current data compression circuit 702 (also referred to as CM (B)) is the same as that in FIG. 1B, as well.

Consequently, 711 (input control line) and 712 (output control line) in the current data compression circuit 701 correspond to 24 (first control line) and 25 (second control line) in FIG. 1B, respectively. The same applies to the current data compression circuit 702, namely 713 (input control line) and 714 (output control line) in the current data compression circuit 702 correspond to 24 (first control line) and 25 (second control line) in FIG. 1B, respectively.

Reference numeral 720 in the current data compression circuits 701 and 702 corresponds to the current data input line 21 in FIG. 1B. Reference numeral 730 in the current data compression circuits 701 and 702 corresponds to the output line 22 in FIG. 1B, and also the data line in FIG. 8.

CM (A) and CM (B) operate complementarily each other. That is, while CM (A) reads in a video signal, CM (B) writes a video signal. Conversely, while CM (A) writes a video signal, CM (B) reads in a video signal.

Figure 9:
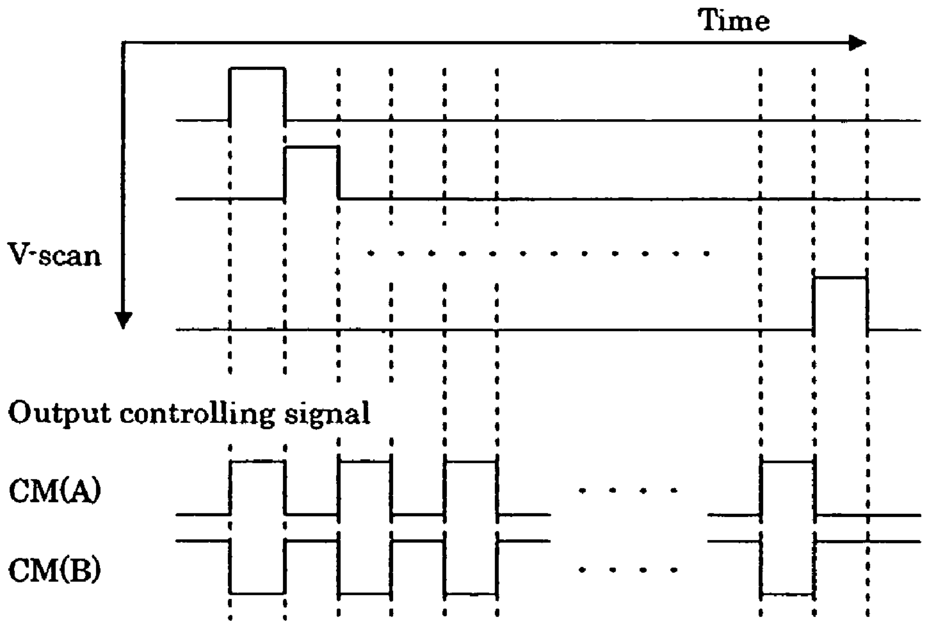
FIG. 9 is an example of a timing chart of an output controlling signal in the data driver circuit shown in FIG. 7.

A timing chart showing the above mentioned operation is FIG. 9. A signal of the output control line 712 for CM (A) and a signal of the output control line 714 for CM (B) are alternately turned ON in synchronous with the selection pulse of the scan line. A signal of the input control line 711 for CM (A) and the signal of the output control line 714 for CM (B) have the same waveform. Similarly, a signal of the input control line 713 for CM (B) and the signal of the output control line 712 for CM (A) have the same waveform, too. As CM (A) and CM (B) operate complementary in this manner, both reading and writing take place all the time. As a result, time is effectively utilized.

By means of polysilicon TFT technology, CM (A) and CM (B) can be integrally fabricated on a substrate of the AM type OLED display device, with the pixel portion 831 and the scan driver circuit 821 and the like. Then CM (A) and CM (B) which compress and output the current of a video signal are performed. Because an external analog signal which tends to be noisy easily is handled as large current and S/N ratio of a video current is improved.

In Embodiment Mode 3, aforementioned explanation is made on the case where the configurations of the current data compression circuits CM (A) and CM (B) are the same as that in FIG. 1B. However, the similar explanation can be applied to the case of other configurations than FIG. 1B.

Embodiment Mode 4

The effect of the invention is explained with reference to FIGS. 4 and 6 in Embodiment Mode 4. Now an operation and effect of the current data compression circuit of the invention is explained with reference to characteristic curves of transistors in FIG. 4. For the effective understanding of the effect, FIG. 4A shows an example with highly variable carrier mobility, and FIG. 4B shows an example with a highly variable threshold voltage.

To simplify the explanation, the case where two transistors configure a drive element is explained. It is to be noted that specific configuration of the current data compression circuit is similar to FIG. 2B. Note that in FIGS. 4 and 6 the positive and negative directions are set on the basis of n-channel type for convenience. (It should be noted that the positive and negative directions are switched in the case of p-channel type transistor as in FIG. 2B.) Further, the characteristic curves shown in FIG. 4 are ideal ones for simplicity and there is a slight difference from an actual transistor. For example, a channel length modulation is 0 in FIG. 4.

Based on a source potential of the transistor, a gate potential is given as $V_g$, a drain potential is given as $V_d$, and a current flowing between the source and drain is given as $I_d$. In FIGS. 4A and 4B, curves 801 to 804 are $I_d$-$V_d$ characteristic curves under a certain constant gate potential $V_g$. A bold dashed line 805 shows the change in $I_d$-$V_d$, under a condition that the $V_g$ and $V_d$ are equal by shorting the gate and drain, for one of the two transistors configuring the drive element. That is, the bold dashed line 805 reflects the specific electrical characteristics (field-effect mobility and a threshold voltage value) of the transistor. Similarly, a bold double-dashed line 806 shows the change in $I_d$-$V_d$, under a condition that the $V_g$ and $V_d$ are equal by shorting the gate and drain, for the other transistor configuring the drive element.

Figure 4A:
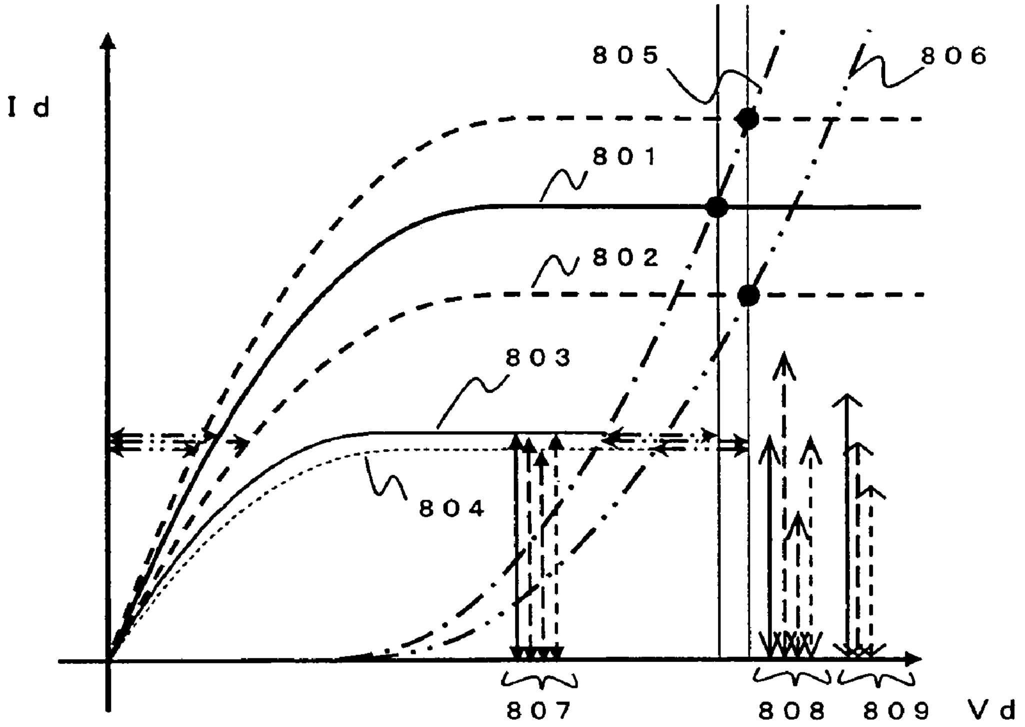
FIGS. 4A and 4B are charts showing the transistor characteristics configuring a drive element.
Figure 4B:
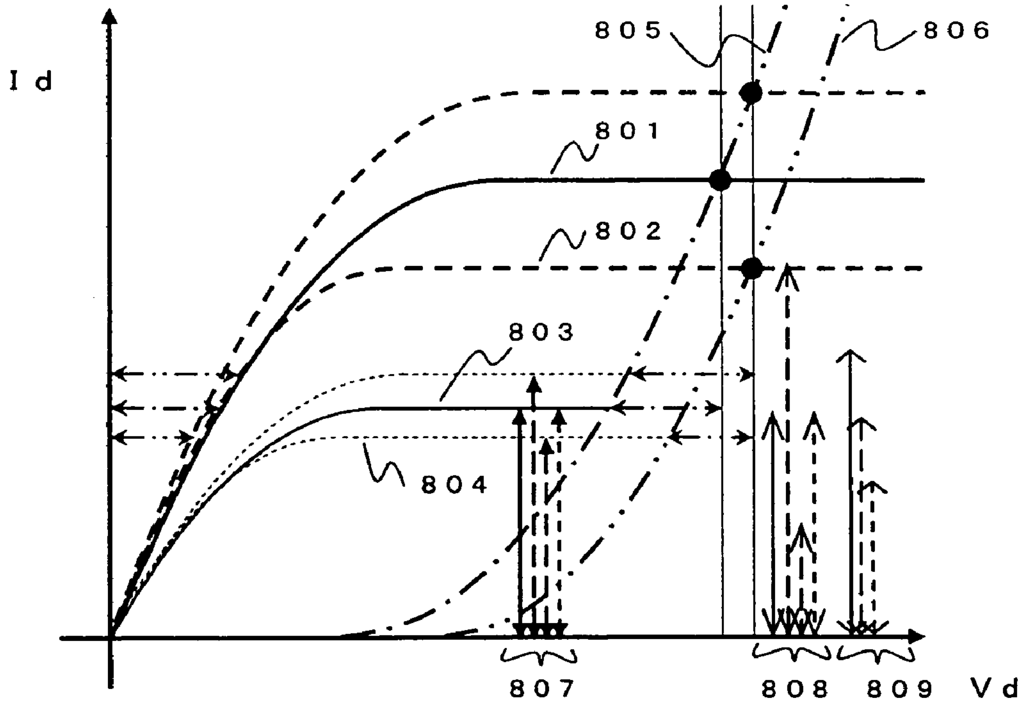

FIGS. 4A and 4B show graphically how the output current changes by a "switching over series and parallel" structure of the invention in the case where the two transistors configuring the drive element have different electrical characteristics. FIG. 4A shows an example in the case where the difference in the field-effect mobility is particularly large between the two transistors. FIG. 4B shows an example in the case where the difference in the threshold voltage value is particularly large between the two transistors. In conclusion, the output current for each case is shown by the length of an arrow with triangular arrowheads of 807. Simple explanation will be made on this below.

Explanation is firstly made on the case where the bold dashed line 805 corresponds to the both characteristic curves of the transistors 15*a* and 15*b*.

When writing data current, the first switch 12 and the second switch 13 in FIG. 2B are turned ON and the third switch 14 is turned OFF. As the first switch 12 and second switch 13 are turned ON, the gate and drain of each of the transistors 15*a* and 15*b* configuring the drive element are shorted. Therefore, an operation point of each of the transistors 15*a* and 15*b* is on the bold dashed line 805, which is dependent on a data current value $I_w$. Now it is assumed that the operation points are the intersection points of the bold dashed line 805 and the curve 801. That is, it is assumed that the data current value $I_w$ is twice as large as the vertical axis value $I_d$ of the intersection point of the line 805 and the curve 801.

When outputting data current, the first switch 12 and the second switch 13 in FIG. 2B are turned OFF and the third switch 14 is turned ON. As the first switch 12 and second switch 13 are turned OFF, the gate potential of the transistors 15*a* and 15*b* is maintained as is at the value during the data current is written. The transistor 15*b* operates in saturation region and the transistor 15*a* operates in non-saturation region when outputting data current. At the time of data current output, the curve 801 corresponds to an $I_d$-$V_d$ characteristic curve of the transistor 15 and the curve 803 corresponds to the one of the transistor 15*b*.

Each of dashed line arrows in FIG. 4A is equal in the length and the ordinate to each other. During data current output, the operation point of the transistor 15*a* is the contact point of the right end of a dashed line arrow on the left side and the curve 801. An output current $I_E$ to be determined is the ordinate of the dashed line arrow, namely the length of a solid line arrow with triangular arrowheads of 807. Note that the same as FIG. 4A can be applied to FIG. 4B, and the output current $I_E$ to be determined is the length of the solid line arrow with triangular arrowheads of 807. In the case where the characteristic curves of the transistors 15*a* and 15*b* are equal, the output current $I_E$ to be determined consequently becomes ¼ of the input data current value $I_w$.

Next, explanation is made on the case where the bold double-dashed line 806 corresponds to the characteristic curve of the transistor 15*a*, and the bold dashed line 805 corresponds to the characteristic curve of the transistor 15*b*. An input data current value $I_w$ is identical to the one in the case discussed above where the bold dashed line 805 corresponds to the both characteristic curves of the transistors 15*a* and 15*b*.

When writing data current, the gate and drain of each of the two transistors 15*a* and 15*b* configuring the drive element are shorted. Therefore, the operation point of the transistor 15*a* is on the bold double-dashed line 806 and the operation point of the transistor 15*b* is on the bold dashed line 805. The sum of the ordinates of the operation points of the transistors 15*a* and 15*b* is the data current value $I_w$. The operation point of the transistor 15*a* therefore is the intersection point of the bold double-dashed line 806 and the curve 802. The operation point of the transistor 15*b* is on the bold dashed line 805 in which the abscissa and the operation point of the transistor 15*a* are equal.

When outputting data current, the first switch 12 and the second switch 13 in FIG. 2B are turned OFF. Consequently, the gate potential of the transistors 15*a* and 15*b* is maintained as is at the value of when the data current is written. The transistor 15*b* operates in saturation region and the transistor 15*a* operates in non-saturation region when outputting data current. At the time of data current output, the curve 802 corresponds to an $I_d$-$V_d$ characteristic curve of the transistor 15*a*.

Each of double-dashed line arrows which have the same ordinates in FIG. 4A is equal in the length. The above group of double-dashed line arrows is the case under consideration where the bold double-dashed line 806 corresponds to the characteristic curve of the transistor 15*a*, and the bold dashed line 805 corresponds to the characteristic curve of the transistor 15*b*. During data current output, the operation point of the transistor 15*a* is the contact point of the right end of a double-dashed line arrow on the left side and the curve 802. An output current $I_E$ to be determined is the ordinate of the double-dashed line arrow, namely the length of a long broken line arrow with triangle arrowheads (left side) of 807. Note that the same as FIG. 4A can be applied to FIG. 4B, and the output current $I_E$ to be determined is the length of the long broken line arrow with triangle arrowheads (left side) of 807.

Further, the case where the bold dashed line 805 corresponds to the characteristic curve of the transistor 15*a*, and the bold double-dashed line 806 corresponds to the characteristic curve of the transistor 15*b* can also be similarly considered. Details are not discussed here, but the results show that the output current $I_E$ to be determined is the length of the long broken line arrow with triangle arrowhead (right side) of 807 in both FIGS. 4A and 4B.

In addition to this, a case where the bold double-dashed line 806 corresponds to the both characteristic curves of the transistors 15*a* and 15*b* can also be similarly considered. The results show that the output current $I_E$ to be determined is the length of a short broken line arrow with triangular arrowheads of 807 in both FIGS. 4A and 4B.

An outline of how variations in the characteristics of the transistors 15*a* and 15*b* configuring the drive element are reflected in the output current $I_E$ can be seen from the lengths of the arrows with triangular arrowheads 807 in FIGS. 4A and 4B.

Arrows with sharp arrowheads 808 in FIGS. 4A and 4B are used for comparison. The arrows with sharp arrowheads 808 are the results of the similar consideration to those above in the case where the current data compression circuit uses a current programming method current mirror. That is, the arrows with sharp arrowheads show how the output current $I_E$ changes in the case where two transistors in a current mirror have different electrical characteristics similar to those above.

The following points can be found by comparing the arrows with triangle arrowheads 807 and the arrows with sharp arrowheads 808 in FIGS. 4A and 4B.

First, for the arrows with triangle arrowheads 807 and the arrows with sharp arrowheads 808, the output current $I_E$ is constant whether the characteristic curves of the transistors are the line 805 or the line 806 unless two transistors in a current data compression circuit have different electrical characteristics. That is, it is not necessary to be equal in the transistor characteristics over a whole substrate both for the current data compression circuit using a current mirror and for the one using a "switching over series and parallel" circuit of the invention. It is sufficient as long as the characteristic variations between the two transistors in the same current data compression circuit is suppressed.

However, in the case where two transistors in the current data compression circuit have different electrical characteristics, variations in the output current $I_E$ increase as shown by the arrows with sharp arrowheads 808. That is to say, in the case of a current data compression circuit using a current programming method current mirror, the influence of the characteristic variations between the two transistors in the same current data compression circuit appears intensely. On the other hand, in the case of a current data compression circuit using a "switching over series and parallel" circuit of the invention, the influence of the characteristic variations between the two transistors in the same current data compression circuit is greatly suppressed.

In producing the current data compression circuit actually, such the characteristic variations between transistors become a serious problem as the one over a wide area, or a whole substrate, not as the one within a limited area like the current data compression circuit. Thus the characteristic variations between the two transistors in the same current data compression circuit is not quite a problem in practice provided that it is suppressed to a similar extent as the "switching over series and parallel" circuit of the invention.

Figure 6A:
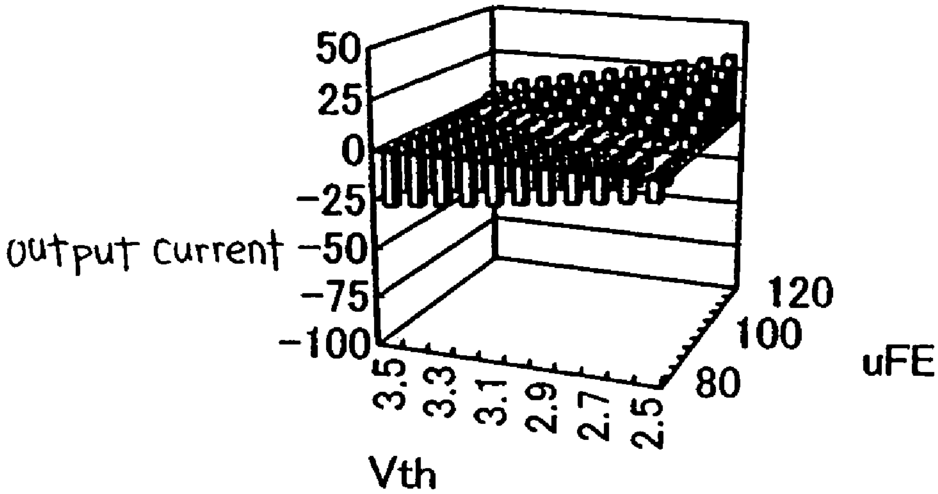
FIGS. 6A and 6B are charts showing examples of a variation in output current from a current data compression circuit.
Figure 6B:
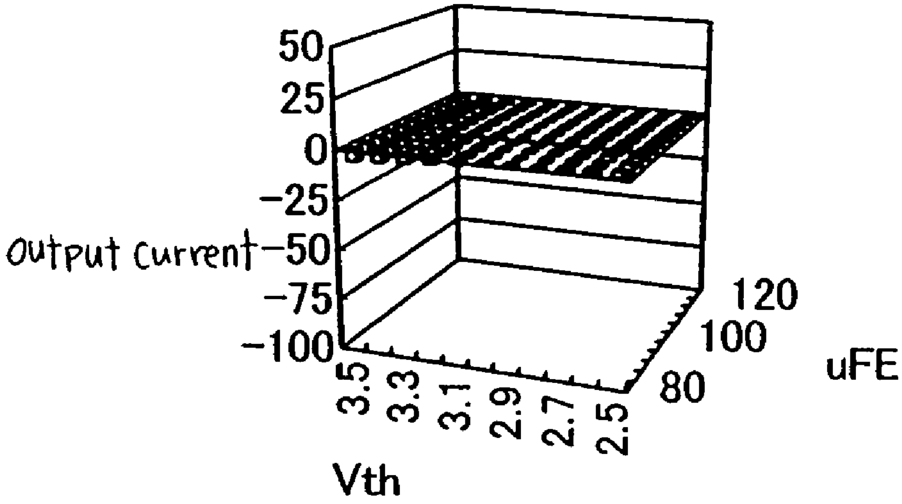

FIGS. 6A and 6B show an example of quantitatively comparing the current data compression circuit using a current mirror circuit and the current data compression circuit using the "switching over series and parallel" circuit of the invention. A unit of a field effect mobility uFE, a threshold voltage Vth, and an output current $I_E$ is [cm$^2$/Vs], [V], and [a.u.] respectively in FIGS. 6A and 6B. The output current value is standardized so that the $I_E$ is 0 [a.u.] when the two transistors in the same current data compression circuit have standard characteristic values, and the $I_E$ is −100[a.u.] when the output current is 0[A].

First, the characteristics of one of the two transistors in the same current data compression circuit are fixed to standard characteristic values. It is assumed that the standard value of a field effect mobility uFE is 100 [cm$^2$/Vs], and the standard value of a threshold voltage Vth is 3 [V]. Then the output current value is simulated across different values for the characteristics of the other transistor in the same current data compression circuit. Values of the field effect mobility uFE are varied in a range from 80 to 120 [cm$^2$/Vs], and values of the threshold voltage Vth are varied from 2.5 to 3.5 [V].

FIG. 6A is for the case of the current data compression circuit using a current mirror circuit, and FIG. 6B is for the case of the current data compression circuit using a "switching over series and parallel" circuit of the invention. The characteristic variations between two transistors in the same current data compression circuit depends greatly on production steps. However, with present standard production steps of polisilicon TFT, variations of the field effect mobility uFE and of the threshold voltage Vth to a similar extent as shown in FIG. 6 is usual. That is, it can be seen that there is a possibility of variations of an output current to a range of plus to minus 25% for the case of the current data compression circuit using the current mirror circuit, which is a common circuit. On the other hand, it can be seen that variations of an output current can be suppressed to within a permissible range for practical use for the case of the current data compression circuit using the "switching over series and parallel" circuit of the invention.

Note that, the simulations of FIGS. 6A and 6B were performed with realistic arbitrary values for structural parameters of the transistors for convenience. By varying an operation voltage of the transistor by changing the values for structural parameters of the transistor, it can be seen that variations in an output current are reduced as the operation voltage becomes higher.

In Embodiment Mode 4, the effect of the invention in the case where the number of transistors n configuring a drive element is two is explained as an example. Similar effects are obtained for cases where the number of transistors n configuring the drive element is three or more. However, note that the effect of reducing influence of TFT characteristic variations becomes weaker as the number of transistors n configuring the drive element increases. Conversely, compression rate of a current can be increased as the number of transistors n increases. An optimum value of n, therefore, varies depending on applications.

Furthermore, it is assumed in Embodiment Mode 4 that the transistor characteristic is ideal and parasitic resistance and ON resistance and the like of the transistor connected in series are ignored, however, in practice they have a slight influence. However, it is needless to say that the current data compression circuit of the invention is still efficient for suppressing the variation in an output current.

Embodiment Mode 5

In Embodiment Mode 5, some examples of an electronic apparatus using a current data compression circuit of the invention are shown.

Given as examples of an electronic apparatus that employs the current data compression circuit of the invention are a monitor, a video camera, a digital camera, a goggle type display (head mounted display), a navigation system, a sound reproducing system (audio component stereo, car audio system, or the like), a laptop computer, a game machine, a portable information terminal (a mobile computer, a mobile phone, a portable game machine, an electronic book, etc.), and an image reproducing device equipped with a recording medium (specifically, a device equipped with a display device which can reproduce a recording medium such as a digital versatile disk (DVD), and can display the image thereof). Specific examples of the electronic apparatus are shown in FIG. 5.

Figure 5A:
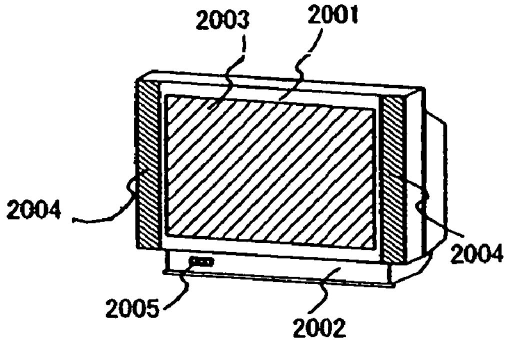
FIGS. 5A to 5H are examples of electronic apparatus using a current data compression circuit of the invention.

FIG. 5A is a monitor which, in this example, is composed of a case 2001, a support base 2002, a display portion 2003, a speaker portion 2004, a video input terminal 2005, and the like. The current data compression circuit of the invention can be used in an IC (Integrated Circuit) for controlling the display portion 2003 and the speaker portion 2004, an IC for processing video signals, or a system circuit and the like. The current data compression circuit of the invention can be used in a data driver circuit of the display portion 2003. Further, in the case where the current data compression circuit of the invention is fabricated by using polysilicon TFTs, it can be used with fabricated directly on a substrate in the display portion 2003. Note that the term monitor includes all the display devices for displaying information, such as for personal computers, for receiving TV broadcasting, and for advertising.

Figure 5B:
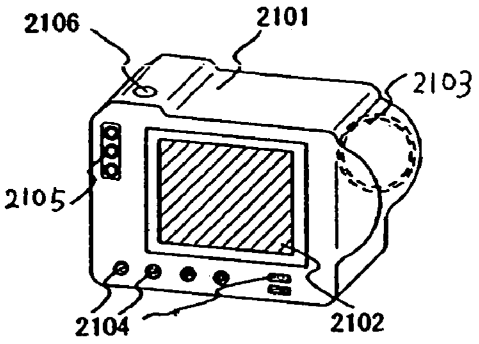

FIG. 5B is a digital still camera which, in this example, is composed of a main body 2101, a display portion 2102, an image-receiving portion 2103, operation keys 2104, an external connection port 2105, a shutter 2106, and the like. The current data compression circuit of the invention can be used in an IC (Integrated Circuit) for controlling the display portion 2102 and the image-receiving portion 2103, an IC for processing video signals, or a system circuit and the like. The current data compression circuit of the invention can be used in a data driver circuit of the display portion 2102. In the case where the current data compression circuit of the invention is fabricated by using polysilicon TFTs, it can be used with fabricated directly on a substrate in the display portion 2102.

Figure 5C:
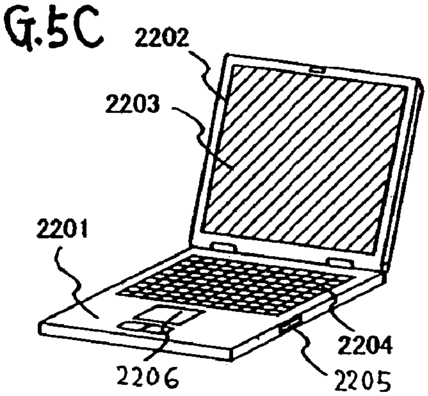

FIG. 5C is a laptop computer which, in this example, is composed of a main body 2201, a case 2202, a display portion 2203, a keyboard 2204, an external connection port 2205, a pointing mouse 2206, and the like. The current data compression circuit of the invention can be used in an IC (Integrated Circuit) for controlling the display portion 2203, an IC for processing video signals, or a system circuit and the like. The current data compression circuit of the invention can be used in a data driver circuit of the display portion 2203. In the case where the current data compression circuit of the invention is fabricated by using polysilicon TFTS, it can be used with fabricated directly on a substrate in the display portion 2203.

Figure 5D:
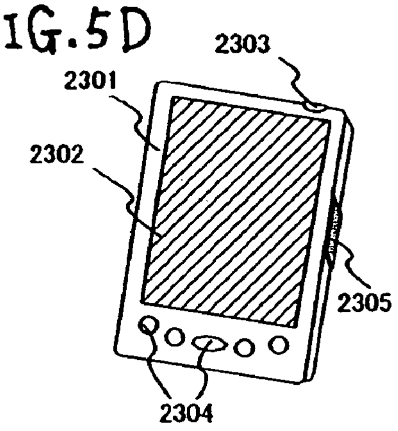

FIG. 5D is a mobile computer which, in this example, is composed of a main body 2301, a display portion 2302, a switch 2303, operation keys 2304, an infrared port 2305, and the like. The current data compression circuit of the invention can be used in an IC (Integrated Circuit) for controlling the display portion 2302, an IC for processing video signals, or a system circuit and the like. The current data compression circuit of the invention can be used in a data driver circuit of the display portion 2302. In the case where the current data compression circuit of the invention is fabricated by using polysilicon TFTs, it can be used with fabricated directly on a substrate in the display portion 2302.

Figure 5E:
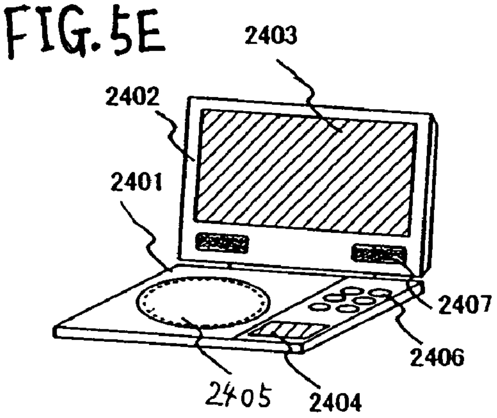

FIG. 5E is a portable image reproduction device provided with a recording medium (specifically, a DVD reproduction device) which, in this example, is composed of a main body 2401, a case 2402, a display portion A 2403, a display portion B 2404, a recording medium (such as a DVD) read-in portion 2405, operation keys 2406, a speaker portion 2407, and the like. The current data compression circuit of the invention can be used in an IC (Integrated Circuit) for controlling the display portion A 2403 and the display portion B 2404, an IC for processing video signals, or a system circuit and the like. The current data compression circuit of the invention can be used in a data driver circuit of the display portion A 2403 and the display portion B 2404. In the case where the current data compression circuit of the invention is fabricated by using polysilicon TFTs it can be used with fabricated directly on a substrate in the display portions 2403 and 2404. Note that image reproduction devices provided with a recording medium include game machines for domestic use and the like.

Figure 5F:
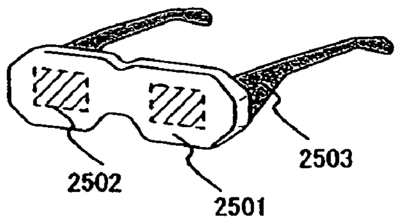

FIG. 5F is a goggle type display (head mounted display) which, in this example, is composed of a main body 2501, a display portion 2502, an arm 2503, and the like. The current data compression circuit of the invention can be used in an IC (Integrated Circuit) for controlling the display portion 2502, an IC for processing video signals, or a system circuit and the like. The current data compression circuit of the invention can be used in a data driver circuit of the display portion 2502. In the case where the current data compression circuit of the invention is fabricated by using polysilicon TFTs, it can be used with fabricated directly on a substrate in the display portion 2502.

Figure 5G:
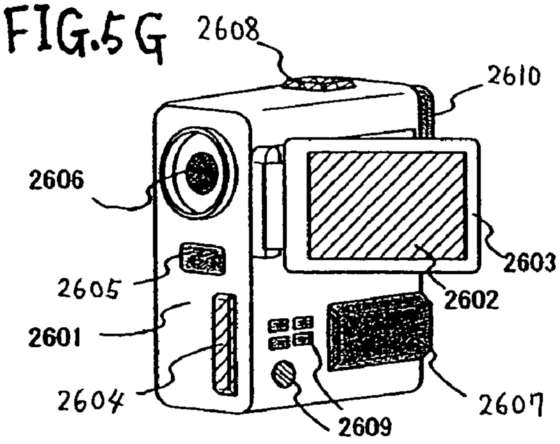

FIG. 5G is a video camera which, in this example, is composed of a main body 2601, a display portion 2602, a case 2603, an external connection port 2604, a remote control receiving portion 2605, an image receiving portion 2606, a battery 2607, an audio input portion 2608, operation keys 2609, an eyepiece portion 2610[sic], and the like. The current data compression circuit of the invention can be used in an IC (Integrated Circuit) for controlling the display portion 2602, an IC for processing video signals, or a system circuit and the like. The current data compression circuit of the invention can be used in a data driver circuit of the display portion 2602. In the case where the current data compression circuit of the invention is fabricated by using polysilicon TFTs, it can be used with fabricated directly on a substrate in the display portion 2602.

Figure 5H:
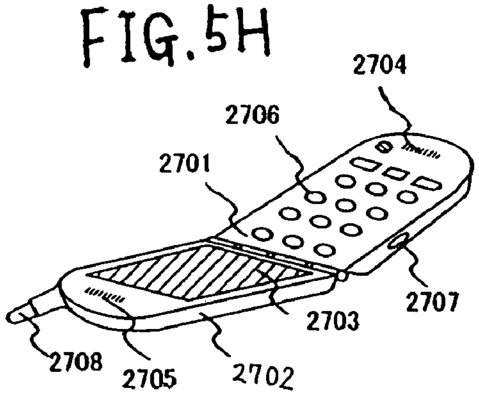

FIG. 5H is a mobile phone which, in this example, is composed of a main body 2701, a case 2702, a display portion 2703, an audio input portion 2704, an audio output portion 2705, operation keys 2706, an external connection port 2707, an antenna 2708, and the like. The current data compression circuit of the invention can be used in an IC (Integrated Circuit) for controlling the display portion 2703, an IC for processing video signals, or a system circuit and the like. The current data compression circuit of the invention can be used in a data driver circuit of the display portion 2703. In the case where the current data compression circuit of the invention is fabricated by using polysilicon TFTs, it can be used with fabricated directly on a substrate in the display portion 2703.

The applicable range of the invention is extremely wide, and it is possible to apply the invention to electronic apparatus and the like in all fields and not exclusively limited to above-described examples.

In the current data compression circuit of the invention, a drive element is configured by a plurality of transistors. When reading in a data current, the plurality of transistors become the parallel connection state and when outputting the current, the plurality of transistors become the series connection state. Thus, the invention is characterized by appropriately switching over parallel and series states of the plurality of transistors configuring the drive element. As a result, the following effect occurs.

First of all, as long as a variation does not exist among the plurality of transistors configuring the drive element in the same current data compression circuit, a critical defect that an output current $I_E$ varies can be avoided. That is, electrical characteristics of transistors disposed in different current data compression circuits sometimes vary greatly when observed as a whole substrate even if they are the same in size. However, it is possible to avoid that this variation is reflected to the different current data compression circuits on the substrate as the output current $I_E$. Also in the case where a current mirror circuit as in FIG. 3 is employed, the output current $I_E$ as a whole substrate does not vary as long as transistors in the current mirror circuit in the same current data compression circuit do not vary in electrical characteristics. In this respect, the invention has the same effect as the case of the current data compression circuit which employs the current mirror circuit as shown in FIG. 3.

In the case where the current mirror circuit as in FIG. 3 is employed, however, when a variation exists between transistors of the current mirror circuit in the same current data compression circuit, it ends in the variation of the output current $I_E$ between the different current data compression circuits. On the other hand, in this invention, even when a variation exists among the plurality of transistors configuring a drive element in the same current data compression circuit, the effect can be suppressed so small that the output current does not vary between the current data compression circuits so much as to be a problem in practical use.

What is claimed is:

1. An electronic circuit comprising:

a drive element including a plurality of transistors; and a plurality of switches connected to at least one of the plurality of transistors, wherein gates of the plurality of transistors are connected to each other, at least one of a source or a drain of each of the plurality of transistors is connected to a source or a drain of another transistor of the plurality of transistors, and wherein an inputted current to the electronic circuit is compressed when outputted from the electronic circuit by turning on or off each of the plurality of switches so as to connect the plurality of transistors either in series or parallel.

2. The electronic circuit according to claim 1, wherein channel types, channel lengths, channel Widths and insulating film thicknesses of the plurality of transistors are all equal.

3. The electronic circuit according to claim 1, wherein the plurality of transistors are polysilicon TFTs.

4. An integrated circuit or a system circuit comprising the electronic, circuit of claim 1.

5. A display device using a data driver circuit comprising the electronic circuit of claim 1.

6. An electronic apparatus selected form the group consisting of a monitor, a digital camera, a laptop computer, a mobile computer, a portable image reproduction device, a goggle type display, a video camera, and a mobile phone comprising the electronic circuit of claim 1.

7. An electronic circuit comprising:
- a drive element including a plurality of transistors; and
- a plurality of switches connected to at least one of the plurality of transistors,
- wherein gates of the plurality of transistors are connected to each other,
- wherein the plurality of transistors are connected in parallel when inputting a current to the electronic circuit, and the plurality of transistors are connected in series when outputting a current from the electronic circuit by turning on or off each of the plurality of switches.

8. The electronic circuit according to claim 7, wherein channel types, channel lengths, channel widths and insulating film thicknesses of the plurality of transistors are all equal.

9. The electronic circuit according, to claim 7, wherein the plurality of transistors are polysilicon TFTs.

10. An integrated circuit or a system circuit comprising the electronic circuit of claim 7.

11. A display device using a data driver circuit comprising the electronic circuit of claim 7.

12. An electronic apparatus selected form the group consisting of a monitor, a digital camera, a laptop computer, a mobile computer, a portable image reproduction device, a goggle type display, a video camera, and a mobile phone comprising the electronic circuit of claim 7.

13. An electronic circuit which compresses an inputted current when outputting, comprising:
- a drive element including a plurality of transistors; and
- a plurality of switches connected to at least one of the plurality of transistors,
- wherein each gate of the plurality of transistors is connected to each other,
- at least one of a source or a drain of each of the plurality of transistors is connected to a source or a drain of another transistor of the plurality of transistors, and
- the plurality of transistors can be connected either in series or parallel by turning on or off each of the plurality of switches.

14. The electronic circuit according to claim 13, wherein channel types, channel lengths, channel widths and insulating film thicknesses of the plurality of transistors are all equal.

15. The electronic circuit according to claim 13, wherein the plurality of transistors are polysilicon TFTs.

16. An integrated circuit or a system circuit comprising the electronic circuit of claim 13.

17. A display device using a data driver circuit comprising the electronic circuit of claim 13.

18. An electronic apparatus selected form the group consisting of a monitor, a digital camera, a laptop computer, a mobile computer, a portable image reproduction device, a goggle type display, a video camera, and a mobile phone comprising the electronic circuit of claim 13.

19. An electronic circuit comprising:
- n transistors;
- a first switch; and
- a second switch,
- wherein gates of the n transistors are connected to each other electrically,
- either sources or drains of the n transistors are electrically connected to the first switch respectively,
- another sources or drains of the n transistors are electrically connected to the second switch respectively,
- when a current inputted to the electronic circuit, as for a kth transistor (2≦k<n) in the n transistors, a current flows from the side connected to the second switch to the side connected to the first switch, and
- when a current is outputted from the electronic circuit, as for the kth transistors, a current flows through a (k−1)th transistor to a (k+1)th transistor via the kth transistor.

20. The electronic circuit according to claim 19, wherein channel types, channel lengths, channel widths and insulating film thicknesses of the plurality of transistors are all equal.

21. The electronic circuit according to claim 19, wherein the plurality of transistors are polysilicon TETs.

22. An integrated circuit or a system circuit comprising the electronic, circuit of claim 19.

23. A display device using a data driver circuit comprising the electronic circuit of claim 19.

24. An electronic apparatus selected form the group consisting of a monitor, a digital camera, a laptop computer, a mobile computer, a portable image reproduction device, a goggle type display, a video camera, and a mobile phone comprising the electronic circuit of claim 19.

25. A monitor comprising:
- a case; and
- a display portion supported by the case, said display portion comprising:
- a drive element including a plurality of transistors; and
- a plurality of switches connected to at least one of the plurality of transistors,
- wherein each gate of the plurality of transistors is connected to, each other,
- at least one of a source or a drain of each of the plurality of transistors is connected to a source or a drain of another transistor of the plurality of transistors, and
- the plurality of transistors can be connected either in series or parallel by turning on or off each of the plurality of switches.

26. A monitor comprising:
- a case; and
- a display portion supported by the case, said display portion comprising:
- a drive element including a plurality of transistors;
- n transistors;
- a first switch; and
- a second switch,
- wherein gates of the n transistors are connected to each other electrically,
- either sources or drains of the n transistors are electrically connected to the first switch respectively,
- another sources or drains of the n transistors are electrically connected to the second switch respectively,
- when a current is inputted to the electronic, circuit, as for a kth transistor (2≦k<n) in the n transistors, a current flows from the side connected to the second switch to the side connected to the first switch, and
- when a current is outputted from the electronic circuit, as for the kth transistors, a current flows through a (k−1)th transistor to a (k+1)th transistor via the kth transistor.

* * * * *